Oct. 10, 1950     G. A. WAHLMARK     2,525,326
ANTIFRICTION TRANSMISSION
Filed June 4, 1947     2 Sheets-Sheet 1
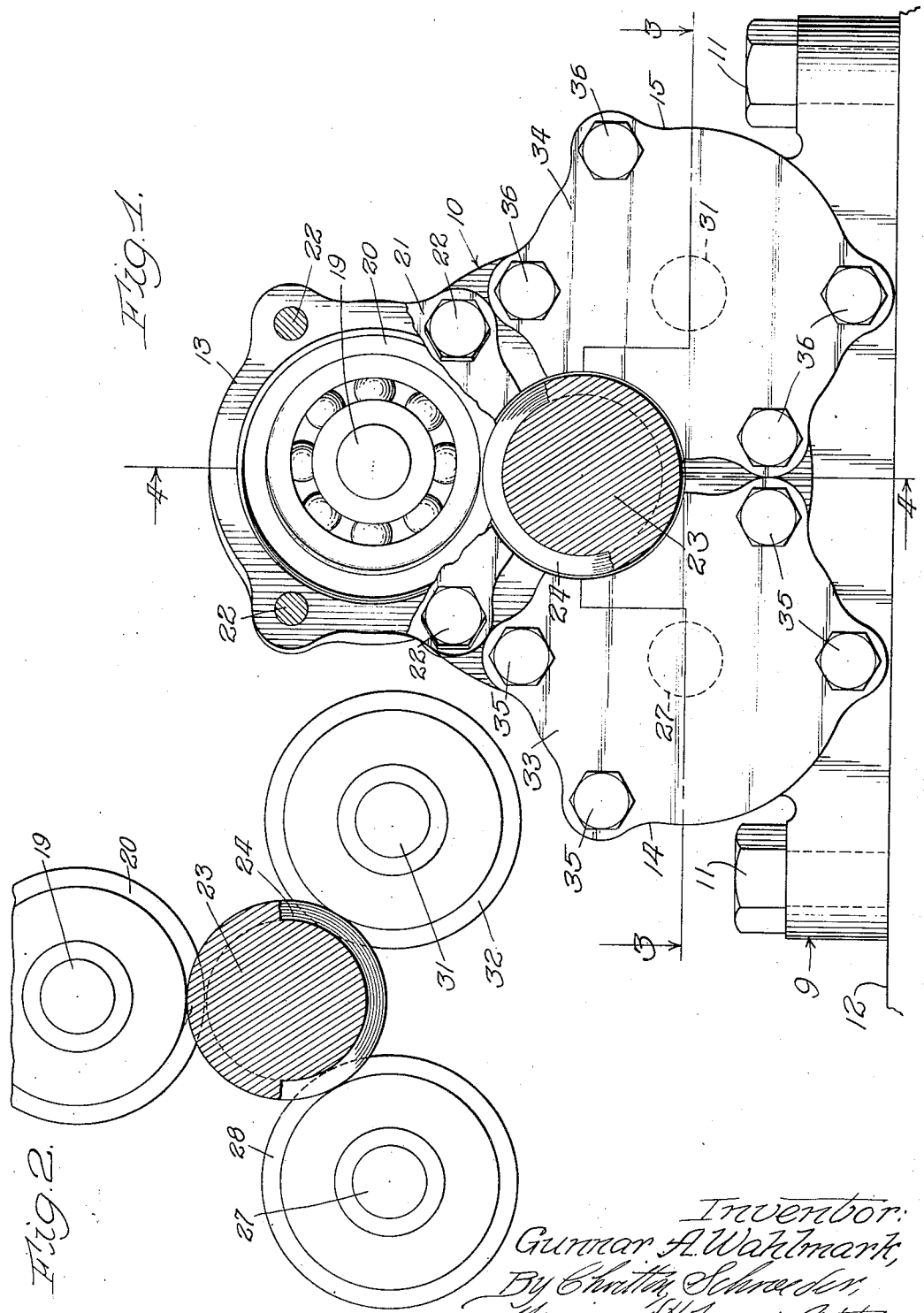

Oct. 10, 1950        G. A. WAHLMARK        2,525,326
ANTIFRICTION TRANSMISSION
Filed June 4, 1947                                                       2 Sheets-Sheet 2
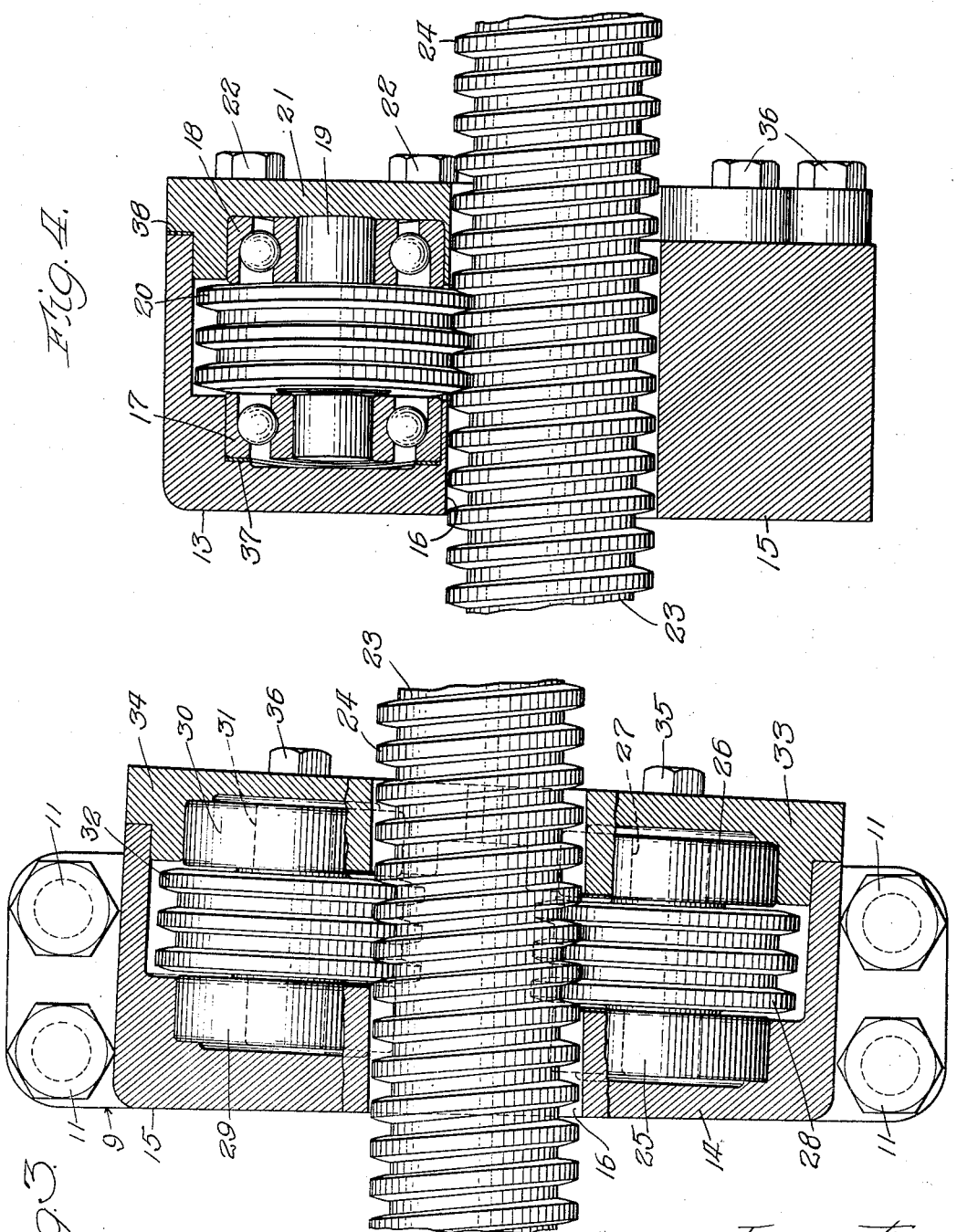
Inventor:
Gunnar A. Wahlmark,
By Clinton, Schroeder,
Merriam & Hofgren, Attys.

Patented Oct. 10, 1950

2,525,326

UNITED STATES PATENT OFFICE 2,525,326

ANTIFRICTION TRANSMISSION

Gunnar Axel Wahlmark, Rockford, Ill., assignor to Sundstrand Machine Tool Co., Rockford, Ill., a corporation of Illinois Application June 4, 1947, Serial No. 752,401

4 Claims. (Cl. 74—424.8)

This invention relates to an anti-friction device, and more particularly to an anti-friction transmission.

It is an object of this invention to provide a screw type transmission of improved construction and arrangement.

Another object of the invention is to provide a screw type transmission having a low frictional loss.

Another object of the invention is to provide a screw type transmission in which the power transmitting member is in rolling contact with the screw.

Another object of the invention is to provide a screw type transmission in which the moving parts rotate in anti-friction bearings.

A further object of the invention is to provide a screw type transmission having the low frictional loss common to ball bearing drives, but in which any standard screw may be used on the power side.

A further object of the invention is to provide a screw type transmission which is readily adjustable for the elimination of backlash.

Other further objects of the invention will be apparent from the following description and drawings, in which:

Fig. 1 is an end elevation of the device, with one end plate broken away;

Fig. 2 is a schematic representation thereof;

Fig. 3 is a section taken as indicated at 3—3 of Fig. 1; and

Fig. 4 is a section taken as indicated at 4—4 of Fig. 1.

While my invention is susceptible of embodiment in many different forms, I have shown in the drawings and will herein describe in detail one such embodiment, with the understanding that the present disclosure is to be considered as an exemplification of the principles of the invention and is not intended to limit the invention to the embodiment illustrated. The scope of the invention will be pointed out in the appended claims.

Referring to the drawings in greater detail, a mounting 9 having a trefoil housing 10 is secured by means of bolts 11 to a member to be reciprocated, such as a work carrying table 12 of a machine tool. The housing 10 has identical hollow segments 13, 14 and 15 which are uniformly spaced about a central bore 16. Using the segment 13 as an example, it is provided with a pair of spaced anti-friction bearing raceways 17 and 18 in which a cylindrical element 19 is rotatably mounted. The element 19 is provided with a plurality of annular ribs 20. An end plate 21 is secured by means of bolts 22 to the open side of the segment 13, thus closing the segment except for the side adjacent the bore 16.

A screw 23 having a thread 24 formed thereon extends through the bore 16 and is mounted to be rotated by a source of power (not shown). The cylindrical element 19 forms a screw engaging element, and its annular ribs 20 are in rolling engagement with the thread 24 of the screw. The bearing raceways 17 and 18, and hence the cylindrical element 19 are mounted at an angle with respect to the axis of the screw such that the axis of rotation of the element 19 is substantially perpendicular to the helix of the thread 24 at the area where the thread is engaged by the annular ribs 20. To state this in another way, the annular ribs 20 are substantially parallel to the helix of the thread 24 at their area of engagement therewith.

The hollow segments 14 and 15 are identical with the segment 13, and are provided with similar anti-friction bearing raceways in which are rotatably supported cylindrical elements provided with annular thread engaging ribs. Thus, the segment 14 contains raceways 25 and 26, supporting cylindrical element 27 which is provided with annular ribs 28; and segment 15 contains raceways 29 and 30 supporting cylindrical element 31 having annular ribs 32. The segments 14 and 15 are provided, respectively, with end plates 33 and 34 which are held in place, respectively, by bolts 35 and 36.

The two last described assemblies of raceways and cylindrical elements provided with thread engaging ribs are angularly mounted in the same fashion as is the assembly in the segment 13, so that each set of thread engaging ribs—28 and 32—is substantially parallel to the helix of the thread 24 at its area of engagement therewith.

Since each of the screw engaging elements is mounted for rotation upon ball bearings and is in rolling engagement with the screw thread at the helix angle, when the screw is driven the elements 19, 27 and 31 roll thereon so as to transmit power from the screw to the driven member 12 with very low frictional loss.

It is to be noted that satisfactory power transmission could be obtained with a single segmented housing, containing only one screw engaging element, as 19. However, elimination of backlash is an important element in a power transmission device of the screw type; and by using a plurality of screw engaging elements, adjustment of the components to eliminate backlash is readily accomplished by using shims 37 in back of the raceway 17, and a corresponding gasket 38 between the open edge of the segment 13 and the end plate 21 so as to adjust the element 19 longitudinally of the screw 23.

Likewise, the use of a plurality of screw engaging elements which are uniformly spaced about the circumference of the screw assures a structure in which lateral thrust upon the screw is substantially eliminated.

I have discovered that frictional losses in a transmission of the type just described can be reduced about 90% below that in the conventional screw and nut drive; a great deal of this improvement being due to the fact that there is no sliding of thread upon thread, as in the conventional drive. At the same time, my device provides a more positive transmission of power from the screw than can be obtained with common ball bearing nut arrangement in which the ball bearings form the means of contact between the thread of the screw and the member to be moved, and permits the use of a standard screw rather than the specially threaded screw which is required in the conventional ball bearing nut. The preferred screw for my device is the standard Acme, in which the thread has a side angle $14\frac{1}{2}°$ from a line perpendicular to the axis of the screw.

I claim:

1. In a machine tool having a slidable member to be reciprocated, means for reciprocating said member comprising: a mounting secured to the member, said mounting having a trefoil housing with a central bore extending therethrough; a rotatably mounted screw extending through said central bore; a cylindrical screw engaging element anti-frictionally mounted in each segment of said housing, each of said elements being provided with not more than three annular ribs in rolling engagement with the thread of the screw and being mounted with its annular ribs parallel to the helix of the thread at their area of engagement therewith; and a separate end plate for each of said segments.

2. An anti-friction device comprising: a rotatable screw having a thread formed thereon; a reciprocable member including a trefoil housing the segments of which are spaced at equal intervals about the screw; a cylindrical screw engaging element anti-frictionally mounted in each of said segments; each of said elements being provided with not more than three annular ribs in rolling engagement with the thread of the screw and being mounted with said ribs parallel to the helix of the thread at their area of engagement therewith; and a separate end plate for each of said segments.

3. An anti-friction device comprising: a rotatable screw having a thread formed thereon; a reciprocable member including a trefoil housing the segments of which are spaced at equal intervals about the screw; a cylindrical screw engaging element anti-frictionally mounted in each of said segments, each of said elements being provided with a plurality of annular ribs in rolling engagement with the thread of the screw; and a separate end plate for each of said segments.

4. An anti-friction device comprising: a rotatable screw having a thread formed thereon; a reciprocable member including a trefoil housing the segments of which are spaced at equal intervals about the screw; a cylindrical screw engaging element anti-frictionally mounted in each of said segments, each of said elements being provided with not more than three annular ribs in rolling engagement with the thread of the screw and being mounted with said ribs parallel to the helix of the thread at their area of engagement therewith.

GUNNAR AXEL WAHLMARK.

REFERENCES CITED

The following references are of record in the file of this patent:

UNITED STATES PATENTS

| Number | Name | Date |
|---|---|---|
| 522,249 | Buckley | July 3, 1894 |
| 1,622,987 | Austin | Mar. 29, 1927 |
| 2,131,151 | Smith | Sept. 27, 1938 |
| 2,321,442 | Wilson | June 8, 1943 |
| 2,334,082 | Side et al. | Sept. 21, 1943 |
| 2,441,168 | Richardson | May 11, 1948 |